United States Patent
Levy et al.

(10) Patent No.: US 9,933,450 B2
(45) Date of Patent: Apr. 3, 2018

(54) MOBILITY DETERMINATION

(75) Inventors: Gil Levy, Tel Aviv (IL); Yaron Aizenbud, Haifa (IL)

(73) Assignee: ANAGOG LTD., Ramat Gan (IL)

( * ) Notice: Subject to any disclaimer, the term of this patent is extended or adjusted under 35 U.S.C. 154(b) by 865 days.

(21) Appl. No.: 13/980,924

(22) PCT Filed: Jan. 2, 2012

(86) PCT No.: PCT/IB2012/050014
§ 371 (c)(1),
(2), (4) Date: Jul. 22, 2013

(87) PCT Pub. No.: WO2012/101529
PCT Pub. Date: Aug. 2, 2012

(65) Prior Publication Data
US 2013/0304414 A1     Nov. 14, 2013

Related U.S. Application Data

(60) Provisional application No. 61/435,364, filed on Jan. 24, 2011.

(51) Int. Cl.
| | |
|---|---|
| *G01P 13/00* | (2006.01) |
| *G01C 22/00* | (2006.01) |
| *G06F 17/00* | (2006.01) |
| *G01P 15/00* | (2006.01) |

(52) U.S. Cl.
CPC ........... *G01P 13/00* (2013.01); *G01C 22/006* (2013.01); *G01P 15/00* (2013.01); *G06F 17/00* (2013.01)

(58) Field of Classification Search
USPC ......................................................... 702/141
See application file for complete search history.

(56) References Cited

U.S. PATENT DOCUMENTS

| | | | |
|---|---|---|---|
| 7,847,709 B2 | 12/2010 | McCall et al. | |
| 2003/0162536 A1 | 8/2003 | Panico | |
| 2006/0247847 A1* | 11/2006 | Carter | A47F 10/04 |
| | | | 701/498 |
| 2008/0147308 A1* | 6/2008 | Howard | G01C 21/28 |
| | | | 701/532 |
| 2009/0281725 A1 | 11/2009 | Sakata | |
| 2009/0309759 A1 | 12/2009 | Williams | |
| 2010/0204877 A1 | 8/2010 | Schwartz | |

(Continued)

FOREIGN PATENT DOCUMENTS

WO    2009/125350    10/2009

OTHER PUBLICATIONS

Reddy, S., Mun, M., Burke, J., Estrin, D., Hansen, M., and Srivastava, M. Using Mobile Phones to Determine Transportation Modes, ACM Transactions on Sensor Networks, vol. 6, No. 2, Article 13. Feb. 2010. [retrieved on Apr. 26, 2016]. Retrieved from the internet: <URL: http://dl.acm.org/citation.cfm?id=1689243>.*

(Continued)

*Primary Examiner* — Paul D Lee
(74) *Attorney, Agent, or Firm* — Tutunjian & Bitetto, P.C.

(57) ABSTRACT

A mobile device includes at least one accelerometer and a mobility state determiner to utilize the variance in output of the accelerometer(s) to distinguish at least between a walking state and a driving state of a user of the mobile device.

11 Claims, 2 Drawing Sheets

(56) References Cited

U.S. PATENT DOCUMENTS

2010/0302068 A1    12/2010    Bandukwala
2011/0148623 A1*    6/2011    Bishop .................. G01C 21/20
                                                                               340/539.13

OTHER PUBLICATIONS

Thiagarajan, A., et al., Cooperative Transit Tracking Using Smart-Phones. SenSys'10 Proceedings of the 8th ACM Conference on Embedded Networked Sensor Systems [online], Nov. 2010 [retrieved on Oct. 13, 2017]. Retrieved from the Internet: <URL: https://dl.acm.org/citation.cfm?id=1869993>.*

* cited by examiner

MOBILITY DETERMINATION

CROSS-REFERENCE TO RELATED APPLICATIONS

This application claims benefit from U.S. Provisional Patent Application No. 61/435,364, filed Jan. 24, 2011, which is hereby incorporated in its entirety by reference.

FIELD OF THE INVENTION

The present invention relates to accelerometers generally and to accelerometers in mobile devices in particular.

BACKGROUND OF THE INVENTION

Most mobile devices are equipped with built in accelerometers, which are useful for determining the orientation of the device as well as in detecting sharp movements, such as the shaking of the device.

SUMMARY OF THE PRESENT INVENTION

There is therefore provided, in accordance with a preferred embodiment of the present invention, a mobile device which includes at least one accelerometer and a mobility state determiner. The determiner utilizes the variance in output of the at least one accelerometer to distinguish at least between a walking state and a driving state of a user of the mobile device.

Moreover, in accordance with a preferred embodiment of the present invention, the mobility state determiner includes a peak/valley detector to detect minimum and maximum values in a window of acceleration data from the accelerometer.

Further, in accordance with a preferred embodiment of the present invention, the mobility state determiner includes counters to count the number of large peak-to-valley distances and small peak-to-valley distances within a window of time, where the large peak-to-valley distances indicate walking and the small peak-to-valley distances indicate driving.

There is also provided, in accordance with a preferred embodiment of the present invention, a mobility state determiner which includes means to receive output of at least one accelerometer and a processor to utilize the variance in output of the at least one accelerometer to distinguish at least between a walking state and a driving state of a user of a mobile device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
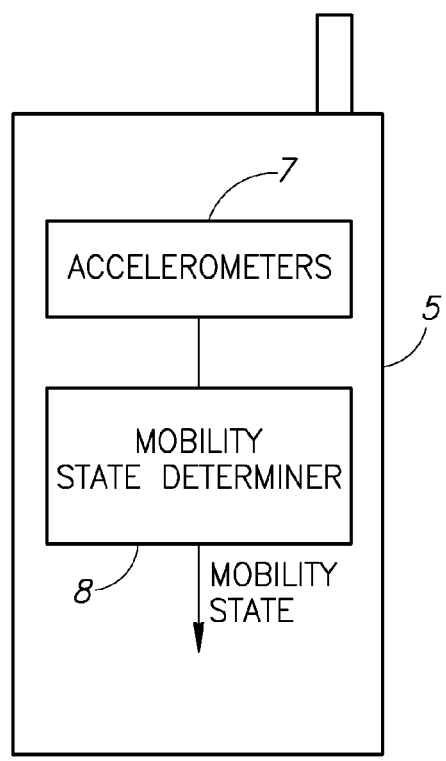
FIG. 1 is a schematic illustration of a mobile device having a mobility state determiner.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that, since most people carry their mobile devices, such as cellular telephones, with them most of the time, and since the output of the accelerometers may vary according to the user's motion (i.e. walking, running, driving, riding a bike, sleeping, etc.), the accelerometers of a mobile device may be used to determine the mobility state of the user, which mobility state may be useful for various types of applications.

While most mobile devices are equipped with a GPS from which it is possible to determine the speed at which the device is moving, the GPS consumes much more power than the accelerometer. Accordingly, using accelerometer data may more be economical when it is necessary to constantly monitor the mobility status and may be available when the GPS is not.

In accordance with a preferred embodiment of the present invention, the mobility status of a mobile device may be determined using the statistical characteristics of the accelerometer readings. For example, a driving pattern may be classified and distinguished from other activities by detecting constant constraint vibrations occurring while driving compared to abrupt accelerations when walking or running or very low acceleration when the phone is not moving.

Reference is now briefly made to FIG. 1, which illustrates a mobile device 5 having accelerometers 7 and a mobility state determiner 8. Mobility state determiner 8 may process the output of accelerometers 7, as described in more detail hereinbelow, to determine the mobility state of the user.

Figure 2:
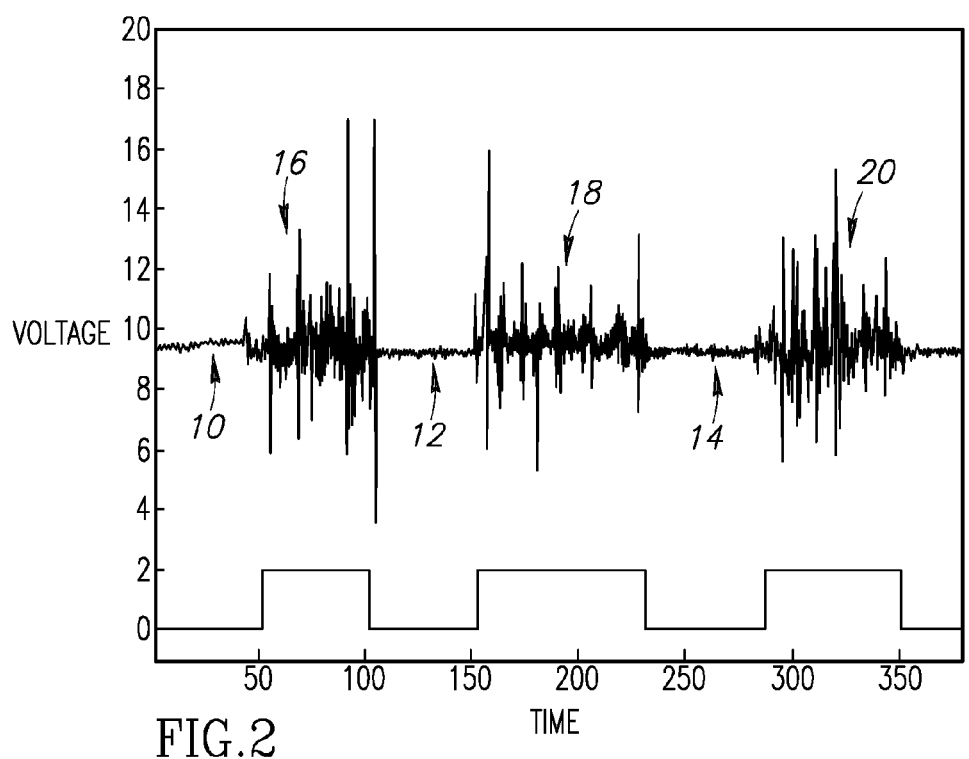
FIG. 2 is a graphical illustration of an accelerometer signal of a user of the device walking and driving.

Reference is now made to FIG. 2, which illustrates the output of an exemplary accelerometer 7 (time vs. voltage) as a user moves between driving and staying still. The user was not moving during the time periods 10, 12 and 14 while during time periods 16, 18 and 20, the user was in a moving car. While the user was not moving (i.e. during time periods 10, 12 and 14), the fluctuations in the accelerometer signal are relatively low. However, the fluctuations rise when device 5 is in motion (i.e. during time periods 16, 18 and 20). This is true even when the device is moving at a constant speed, where the accelerometer values should theoretically be zero (constant speed=0 acceleration). Moreover, the extent of the fluctuations is a function of the speed of motion.

In accordance with a preferred embodiment of the present invention, mobility state determiner 8 may determine one of the following mobility states:

MOVING—device 5 is in motion

WALKING—the user is walking with device 5

VEHICLE MOTION—the user has device 5 in a moving vehicle, such as a car.

REST—device 5 is not moving.

Mobility state determiner 8 may implement an algorithm which may analyze, at each iteration i, an acceleration value $Acc_i$, as follows:

In step 30, determiner 8 may determine the acceleration $Acc_i$ for the ith cycle from the accelerations in each of the three axes, X, Y and Z, where $x_i$ is the X acceleration, $y_i$ is the acceleration in the Y axis and $z_i$ is the acceleration in the Z axis, all at cycle i. In order to check positive and negative acceleration, the effects of gravity have to be eliminated. Equation 1 gives the equation for $Acc_i$.

$$ACC_i = \sqrt{(x_i^2 + y_i^2 + z_i^2)} - 9.8 \quad \text{Equation 1}$$

In step 32, determiner 8 may determine a moving average acceleration, AverageAcc, according to the equation:

$$AverageAcc_i = 0.95 * AverageAcc_{i-1} + 0.05 * Acc_i \quad \text{Equation 2}$$

In step 34, determiner 8 may detect the presence of motion by determining whether or not the average acceleration AverageAcc is above a movement threshold, or:

If $AverageAcc_i$>MOVEMENT_THRESH, then Mobility State=*MOVING*

An exemplary movement threshold may be 0.3.

If the mobility state is not moving, then determiner 8 may perform, in step 36, a peak/valley detection over the acceleration signal Acc, for a window of size Q, which may, for example, be for 5 sec. Determiner 8 may identify all local minimum and maximum points in acceleration signal Acc. In step 37, determiner 8 may enter a loop j over the peak/valley pairs within window Q.

Since the extent of fluctuation changes according to the state of moving (driving or walking), in step 38, determiner 8 may calculate a peak to valley distance $dist_j$ as follows:

$$Dist_j = peak - previous\ valley \quad \text{Equation 3}$$

In steps 40 and 41, determiner 8 may check the peak to valley distance $dist_j$ against walking and driving thresholds, WALK_THRESH1 and DRIVE_THRESH1, where WALK_THRESH1 may define a minimum fluctuation distance for walking, and DRIVE_THRESH1 may define a maximum fluctuation distance for driving. (WALK_THRESH1=3 AND DRIVE_THRESH1=0.2)

If the variance indicated by distance $dist_j$ is high (i.e. above WALK_THRESH1), then distance $dist_j$ defines walking, and, in step 42, determiner 8 may update a walk counter WalkCounter by 1:

If the variance indicated by distance $dist_j$ is low (i.e. distance $dist_j$ is between the two thresholds), then the variance indicates driving and, in step 44, determiner 8 may update a drive counter DriveCounter by 1.

If $dist_j$ has any other value, then determiner 5 may just continue looping.

When loop j has finished, determiner 8 may review the values in the counters. Determiner 6 may declare that the mobility state is now walking (step 48) only once the walk counter WalkCounter has a value larger than a second walk threshold WALK_COUNTER_THRESH and may declare that the mobility state is now driving (step 50) if the drive counter DriveCounter is above a a second drive threshold DRIVE_COUNTER_THRESH. Mathematically:

Mobility state=WALKING if
    WalkCounter>WALK_COUNTER_THRESH

Mobility state=DRIVING if
    DriveCounter>DRIVE_COUNTER_THRESH

Figure 3:
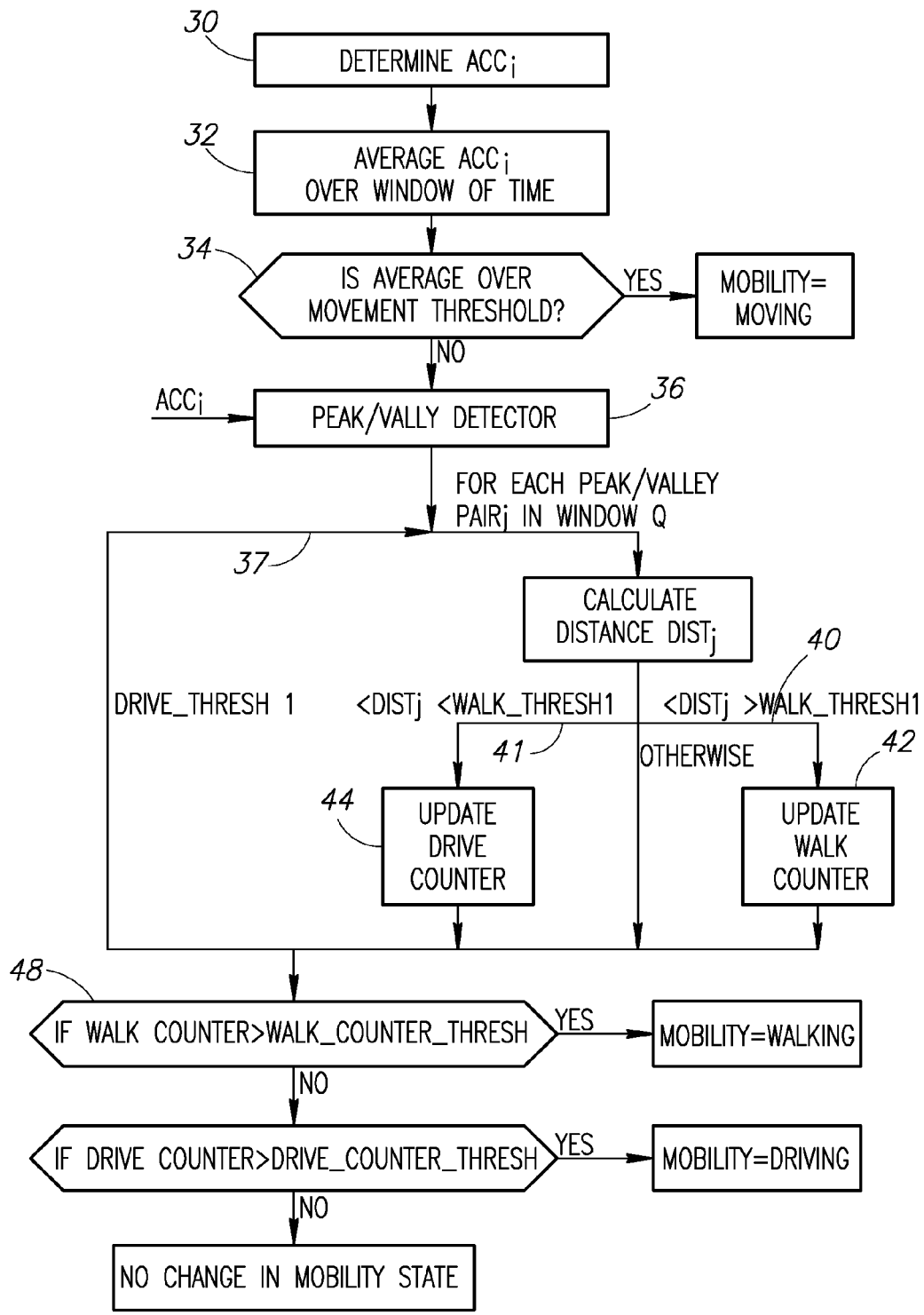
FIG. 3 is a flow chart illustration of a method for determining motion state from the accelerometer signal of FIG. 2.

It will be appreciated that determiner 8 may repeat the process of FIG. 3 at each time i, zeroing out the counters prior to starting the next iteration.

It will be appreciated that the mobility state output of mobility state determiner 8 may be utilized by numerous applications. It will further be appreciated that mobility state determiner 8 may operate whenever the user is moving and thus, may also operate when the user is on a subway, underground, or within a tunnel, all of which are places where GPS systems do not function due to lack of line of sight to the GPS satellites.

For example, U.S. patent application Ser. No. 13/979,397, entitled "Predicting That A Parking Space Is About To Be Vacated", a national phase of PCT application PCT/IB12/50014, filed Jan. 2, 2012, the disclosure of which is incorporated herein by reference, filed concurrently with the present application and assigned to the common assignee of the present application, describes a system for determining parking state which may utilize mobility state determiner 8. Moreover, the system also includes a server which receives moving status updates from multiple devices. With such a system, the output of mobility state determiner 8 may be utilized for other applications. For example, the server may determine where traffic jams are, by receiving reports from devices which are in the driving state (i.e. no traffic jam) and from devices which are not in a driving state. Those devices on the same road and not in a driving state nor in a parking state may be defined as being in a traffic jam or at a traffic light. The server may distinguish the two using mapping software.

Mobility state determiner 8 may provide this ability not only for above ground driving but for traffic in tunnels or other underground systems, such as a subway. Using the accelerometer data, it is possible to know if the device is in motion or not (due to a traffic jam or an accident).

Where the speed is predetermined, such as in a subway train moving at a constant speed, it is possible to determine the location of the device by detecting when driving begins and estimating the device's position according to the time that has elapsed from the beginning of driving.

The server may also determine trip duration using the motion state information from mobility state determiner 8. The server may determine the start of a trip as the start of driving and the end of the trip as the point at which the motion state changes either to parking or walking. Such an estimation takes into account traffic jams and traffic lights on the way.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
    determining a mobility state of a mobile device, wherein the mobile device is on a person, wherein the mobility state is determined by the mobile device having a processor, a Global Positioning System (GPS) sensor and an accelerometer, using the accelerometer while the mobile device and the person are located within a vehicle, and wherein the mobility state is selected from the group consisting of: a walking mobility state and a driving mobility state, wherein said determining the mobility state is performed without using the GPS sensor, whereby limiting power consumption of the mobile device, wherein said determining the mobility state comprises:
        obtaining acceleration readings by the accelerometer within a time window;
        computing peak-valley distances in the acceleration readings, wherein each peak-valley distance is a difference between a peak and a valley for a peak-valley pair in the acceleration readings;
        computing a walking count based on the peak-valley distances;
        computing a driving count based on the peak-valley distances; and
        determining the mobility state based on the walking count and based on the driving count, wherein the walking mobility state is determined based on the walking count being above a first threshold, wherein the driving mobility state is determined based on the driving count being above a second threshold,
    wherein limiting power consumption of the mobile device is achieved by constantly monitoring the mobile device to allow for selectively operating the GPS sensor based on detection of whether GPS data from the GPS sensor is not required by and/or unavailable to the mobile device.
2. The method of claim 1 further comprises:
    determining by the processor, based on the mobility state, a time at which the vehicle began driving; and
    estimating, based on elapsed time since the time at which driving began and based on a predetermined speed of the vehicle, a current location of the vehicle.
3. The method of claim 2, wherein the vehicle drives through a tunnel, wherein said estimating is performed during a time that the vehicle drives through the tunnel, wherein while driving through a tunnel, there is no line of sight between the mobile device and satellites of the GPS sensor.
4. The method of claim 2, wherein said estimating is performed when GPS data from the GPS sensor is unavailable.
5. The method of claim 1, wherein said computing the walking count comprises computing a number of peak-valley distances in the time window for which a distance is above a minimal threshold.
6. The method of claim 1, wherein said computing the driving count comprises computing a number of peak-valley distances in the time window for which a distance is below a maximal threshold.
7. The method of claim 1, wherein the driving mobility state is determined based on the walking count being below the first threshold.
8. A mobile device comprising an accelerometer, and a Global Positioning System (GPS) sensor, wherein said mobile device comprises a mobility state determiner configured to determine a mobility state, wherein the mobility state is selected from the group consisting of: a walking mobility state and a driving mobility state, wherein the mobility state determiner is configured to determine the mobility state without using the GPS sensor, whereby limiting power consumption of the mobile device, wherein the mobility state determiner is configured to:
    obtain acceleration readings by the accelerometer within a time window;
    compute peak-valley distances in the acceleration readings, wherein each peak-valley distance is a difference between a peak and a valley for a peak-valley pair in the acceleration readings;
    compute a walking count based on the peak-valley distances;
    compute a driving count based on the peak-valley distances; and
    determine the mobility state based on the walking count and based on the driving count, wherein the walking mobility state is determined based on the walking count being above a first threshold, wherein the driving mobility state is determined based on the driving count being above a second threshold,
    wherein the mobile device is configured for limiting power consumption by constantly monitoring thereof to allow for selectively operating the GPS sensor based on detection of whether GPS data from the GPS sensor is not required by and/or unavailable to the mobile device.
9. The mobile device of claim 8, wherein the walking count is computed by computing a number of peak-valley distances in the time window for which a distance is above a minimal threshold.
10. The mobile device of claim 8, wherein the driving count is computed by computing a number of peak-valley distances in the time window for which a distance is below a maximal threshold.
11. The mobile device of claim 8, wherein the driving mobility state is determined based on the walking count being below the first threshold.

* * * * *